(12) United States Patent
Schnyder (10) Patent No.: US 10,820,743 B2
(45) Date of Patent: Nov. 3, 2020

(54) SETTING THE LEVEL OF FILL IN A CUP USED WITH A BEVERAGE DISPENSER

(71) Applicant: NESTEC S.A., Vevey (CH)

(72) Inventor: Frank Schnyder, Mont-Pelerin (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/292,807

(22) Filed: Mar. 5, 2019

(65) Prior Publication Data

US 2019/0208952 A1     Jul. 11, 2019

Related U.S. Application Data

(60) Continuation of application No. 14/222,334, filed on Mar. 21, 2014, now abandoned, which is a division of
(Continued)

(30) Foreign Application Priority Data

May 8, 2008  (EP) ..................................... 08155851
Jul. 4, 2008  (EP) ..................................... 08159707

(51) Int. Cl.
  *B67D 1/08*    (2006.01)
  *A47J 31/44*   (2006.01)
(Continued)

(52) U.S. Cl.
  CPC .......... *A47J 31/4403* (2013.01); *B67D 1/001* (2013.01); *B67D 1/0005* (2013.01);
(Continued)

(58) Field of Classification Search
  CPC ... A47J 31/4403; B67D 1/001; B67D 1/0005; B67D 1/0023; B67D 1/0871;
(Continued)

(56) References Cited

U.S. PATENT DOCUMENTS 4,458,735 A   7/1984  Houman
4,767,632 A   8/1988  Meier
(Continued)

FOREIGN PATENT DOCUMENTS

AT   410 377 B    4/2003
DE   44 29 353 A1 2/1996
(Continued)

OTHER PUBLICATIONS

International Search Report and Written Opinion, Appl. No. PCT/EP2009/055377, dated Aug. 4, 2009.
(Continued)

*Primary Examiner* — Craig M Schneider
*Assistant Examiner* — Jason K Niesz
(74) *Attorney, Agent, or Firm* — K&L Gates LLP (57) ABSTRACT

A device for filling a receptacle with a beverage and a user interface for allowing a user to select a desired level of fill of beverage in the receptacle. The interface includes a mechanism for detecting an object below the outlet, such that the receptacle can be filled with the beverage up to the user selected level of fill, wherein the detection mechanism is arranged to detect a position of a human finger or a hand-held freely movable pointing instrument, which human finger or pointing instrument is adjacent to and pointing towards a side of the receptacle, so that the level of fill of the receptacle is determined from the detected position of the finger or pointing instrument the user-selected level of fill and the beverage is dispensed to fill the receptacle up to that level. The device is useful in coffee or other beverage dispensing machines.

35 Claims, 3 Drawing Sheets

Related U.S. Application Data application No. 12/988,492, filed as application No. PCT/EP2009/055377 on May 5, 2009, now abandoned.

(51) Int. Cl.
*B67D 1/00* (2006.01)
*B67D 1/12* (2006.01)

(52) U.S. Cl.
CPC ......... *B67D 1/0023* (2013.01); *B67D 1/0871* (2013.01); *B67D 1/0888* (2013.01); *B67D 2001/1259* (2013.01)

(58) Field of Classification Search
CPC .......... B67D 1/0888; B67D 2001/1259; B67D 2010/00065
USPC .............. 141/94, 83, 95, 192, 198, 227, 360
See application file for complete search history.

(56) References Cited

U.S. PATENT DOCUMENTS

| | | | |
|---|---|---|---|
| 5,312,020 A | 5/1994 | Frei | |
| 5,335,705 A | 8/1994 | Morishita et al. | |
| 5,372,061 A | 12/1994 | Albert et al. | |
| 5,375,508 A | 12/1994 | Knepler et al. | |
| 5,645,230 A | 7/1997 | Marogna et al. | |
| 5,731,981 A | 3/1998 | Simard | |
| 5,836,236 A | 11/1998 | Rolfes | |
| 5,959,869 A | 9/1999 | Miller et al. | |
| 6,182,555 B1 | 2/2001 | Scheer et al. | |
| 6,354,341 B1 | 3/2002 | Saveliev et al. | |
| 6,705,356 B2* | 3/2004 | Barton ................... | B67D 1/124 141/2 |
| 6,759,072 B1 | 7/2004 | Gutwein et al. | |
| 7,546,854 B2* | 6/2009 | Ozanne ................ | B67D 1/1238 141/198 |
| 8,322,384 B2 | 12/2012 | Ashrafzadeh et al. | |
| 8,714,210 B2* | 5/2014 | Ashrafzadeh ......... | F25D 23/126 141/95 |
| 2007/0157820 A1 | 7/2007 | Bunn | |
| 2007/0267098 A1 | 11/2007 | Ozanne et al. | |
| 2009/0173409 A1 | 7/2009 | Ozanne et al. | |

FOREIGN PATENT DOCUMENTS

| | | |
|---|---|---|
| EP | 1 448 084 B1 | 6/2005 |
| EP | 1 676 509 A1 | 7/2006 |
| EP | 1 305 040 B1 | 9/2009 |
| FR | 2 624 844 A1 | 6/1989 |
| GB | 2 397 510 A | 7/2004 |
| JP | 2001-270598 A | 10/2001 |
| WO | 97/25634 A1 | 7/1997 |
| WO | 99/50172 A1 | 10/1999 |
| WO | 2004/030435 A2 | 4/2004 |
| WO | 2004/030438 A2 | 4/2004 |
| WO | 2006/063645 A1 | 6/2006 |
| WO | 2006/090183 A2 | 8/2006 |
| WO | 2007/003062 A1 | 1/2007 |
| WO | 2007/003990 A2 | 1/2007 |
| WO | 2008/138710 A1 | 11/2008 |

OTHER PUBLICATIONS

U.S. Appl. No. 14/222,334, Notice of Allowance, dated Dec. 19, 2014.
U.S. Appl. No. 14/222,334, Non-Final Rejection, dated Mar. 19, 2015.
U.S. Appl. No. 14/222,334, Ex parte Quayle Action, dated Jun. 25, 2015.
U.S. Appl. No. 14/222,334, Ex parte Quayle Action, dated Oct. 21, 2015.
U.S. Appl. No. 12/988,492, Restriction Requirement, dated Dec. 3, 2013.
U.S. Appl. No. 12/988,492, Ex parte Quayle Action, dated Feb. 27, 2014.
U.S. Appl. No. 12/988,492, Ex parte Quayle Action, dated May 22, 2014.
U.S. Appl. No. 12/988,492, Ex parte Quayle Action, dated Oct. 21, 2015.
Patent Interference No. 106,051, *Farhad Ashrafzadeh, Kevin M. Chase, Brian P. Janke, Shreecharan Kanchanavally, and Ronald L. Voglewede*, Junior Party (U.S. Pat. Nos. 8,322,384 and 8,714,210) v. *Frank Schnyder*, Senior Party U.S. Appl. Nos. 12/988,492 and 14/222,334), Interference Decision on Priority, dated Apr. 30, 2018.

* cited by examiner

SETTING THE LEVEL OF FILL IN A CUP USED WITH A BEVERAGE DISPENSER

CROSS-REFERENCE TO RELATED APPLICATIONS

This application is a continuation of U.S. application Ser. No. 14/222,334 filed Mar. 21, 2014, which is a division of U.S. application Ser. No. 12/988,492 filed Oct. 18, 2010, which is the 371 U.S. National Phase of PCT/EP2009/055377, filed May 5, 2009, which claims priority of European patent applications nos. EP 08155851.2 filed May 8, 2008 and EP 08159707.2 filed Jul. 4, 2008.

FIELD OF THE INVENTION

The field of the invention pertains to the setting of the level of fill in cups used with beverage preparation devices, such as coffee machines or similar apparatus.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

The fill of a drink in the receptacle, such as a cup or glass, is usually controlled in several different ways.

In certain modes, the control of fill may be done by storing several fill programs in a controller which itself commands the time of activation of the pump and deactivates the pump via a relay. A drawback comes from the fact that depending on the state of the machine, for example the degree of limescale, the volumes actually delivered may vary significantly. As a consequence, the fill control is customarily done using a flow meter and by a control unit which counts down the number of pulses recorded on the flow meter positioned on the fluid supply circuit. However, a drawback is that it is necessary to provide a series of operating buttons depending on the number of different volumes to be delivered. For example, in a conventional coffee machine, a "ristretto" button is required for extra-short coffees (25 mL), an "espresso" button for short coffees (40 mL) and a "long" button for long coffees (110 mL). There is a real risk of confusion by the user unaccustomed to using the machine; this typically leads to the delivery of excessively strong coffees or to overspills from the cup. Another drawback arises from the lack of flexibility in respect of the user who may want an intermediate volume depending on the type of capsule or drink chosen. The flow meter may also lack accuracy or its accuracy be impaired on account of the scale which builds up on its surfaces. Another drawback arises from the fact that control by flow meter takes no account of the quantity of froth produced; this may lead to a spillover of froth for very frothy products.

Another mode consists in providing manual activation and deactivation of the pump by a button, a lever or some other operating means. Stated otherwise, the user alone is responsible for halting the flow of drink into the cup. However, this raises several drawbacks. One is that the user must remain attentive during the flow of the drink; without this, the system continues to deliver liquid: the risks of spillover are therefore fairly common. Another drawback arises from the fact that manual control such as this is inaccurate. The user may then encounter difficulties in reproducing the fill that he usually desires especially when the drink may produce more or less froth; this may fool the user in the control of the filling of the cup with liquid.

Another mode of control which is more complex and more expensive to implement consists of a means of recognition on a packaged portion of ingredients (for example, a capsule), such as a bar code, which transmits instructions to the machine, so as to tailor the volume to be delivered. In the same way, this system works on the activation of a pump using recorded programs and on the acquisition of data originating from a flow meter.

Various systems for operating a beverage preparation device and for filling automatically a receptacle are disclosed in the patent literature, for instance in AT 410 377, DE 44 29 353, DE 20 2006 019 039, EP 1 305 040, EP 1 448 084, EP 1 676 509, FR 2 624 844, GB 2 397 510, U.S. Pat. Nos. 4,458,735, 4,767,632, 5,312,020, 5,335,705, 5,372,061, 5,375,508, 5,731,981, 5,645,230, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990 and PCT/EP08/054858.

More specifically, U.S. Pat. No. 4,458,735 pertains to a device for automatically controlling the delivery of a drink such as a "milkshake" into a container made of translucent paper or foam. The receptacle is positioned under a source of radiation which directs a light ray against the rim of the receptacle; which ray passes through the receptacle and is detected by a radiation detector situated on the opposite side of the receptacle. The signal received by the detector is compared with a signal value level and when the attenuated signal drops below the signal value level, delivery is halted. Such a device does not allow sufficient detection accuracy, in particular, for coffee receptacles, on account of the way in which the incident signal is detected and then compared. Moreover, this device is unsuitable for translucent receptacles. Finally, the device does not make it possible to choose one's fill position.

Patent application WO 97/25634 pertains to a method and a device for detecting the position of an object such as a container in a target window using the concept of triangulation of radiant energy. Such a device uses a first pair and a second pair of emitters and receivers and uses a triangulation calculation to detect the presence of the container. WO99/50172 discloses a method for detecting and control the filling of a cup with a dispensing apparatus by using a several light transmitters and receivers of light rays reflected by the cup and liquid inside the cup.

Co-pending application PCT/EP08/054858 (in the name of Nestec SA) discloses a beverage preparation device having a touch screen with a virtual representation of a cup on which the user can move up and down a desired level of fill before the beverage dispensing process is initiated to fill the cup to the desired level.

WO 2006/063645 (in the name of Nestec SA) discloses a beverage preparation machine with an interface for selecting the level of fill of a cup to be filled. In one embodiment, a marking means for indicating the desired level of fill on a side of the cup is provided in the form of a user-operable laser beam emitter that forms a displaceable visible spot on the inner side of the cup. The user-operable emitter cooperates with a receiver for detecting the presence of the beverage supplied to the cup when the beverage reaches the desired level of fill to interrupt the supply of the beverage.

SUMMARY OF THE INVENTION

It is therefore a preferred object of the present invention to increase the user-friendliness and the intuitiveness of the selection arrangement of the desired levels of fill in cups of various sizes used in a beverage preparation device.

It is a particular object of the invention to provide a level of fill selection arrangement for various cup sizes which does not need to be preprogrammed as to the cup sizes by the user but which is immediately adaptable with any cup size used by the user.

The invention thus relates to a device for filling a receptacle with a beverage. For instance, the beverage device is a coffee, tea or soup machine, in particular a machine for supplying a beverage by passing hot or cold water or another liquid through a capsule containing an ingredient of the beverage to be supplied, such as ground coffee.

The beverage device comprises means for filling via an outlet a receptacle located below the outlet and a user interface for allowing a user to select a desired level of fill of beverage in the receptacle. The interface comprises a means for detecting an object below the outlet. The filling means are arranged to fill the receptacle up to the user selected level of fill.

In accordance with the invention, the detecting means is arranged to detect a position of a human finger and/or a hand-held freely movable pointing instrument, which human finger or pointing instrument is/are adjacent to and pointing towards a side of the receptacle. The filling means is arranged to derive from the detected position of the finger and/or pointing instrument the user-selected level of fill and to fill the receptacle up to said level.

Such pointing instrument may typically be a stylus or a kitchen utensil such as a tea or coffee spoon, or any other device freely manipulatable by the user to point at a location on a cup representative of a desired level of fill and allow acquisition of this level of fill by the machine for the subsequent filling of the cup.

Being able to indicate the desired level of fill by pointing with a finger and/or pointing instrument directly to the location of the desired level on the cup to be filled, instead of having to provide this information by operating buttons, a touch screen or a laser pointing device, represents a significant increase of the user-friendliness and intuitiveness of the handling of a beverage preparation machine.

To avoid overflow of the receptacle due to an improper level of fill input or to allow non selection of an amount of beverage to be supplied to the machine if the user suddenly changes its mind, the beverage device includes a detector arranged to detect the height of the receptacle, the means for filling being arranged to fill said receptacle only if the detected position of the finger and/or pointing instrument representing the user-selected level of fill is located below the detected height of the receptacle. The finger and/or pointing instrument detecting means optionally forms also this height detector so that no additional detector is needed.

The beverage device may also include a detector arranged to detect the presence of the receptacle under the outlet of the filling means during a beverage filling cycle. In such a case, the filling means can be arranged to stop the filling when the receptacle is moved away from under the outlet. Optionally, the finger and/or pointing instrument detecting means forms also the presence detector to avoid an additional detector.

To determine which level of fill is selected by the user, for example when the user is hesitating and moves his pointing finger and/or pointing instrument up and down along the cup, the detecting means can be arranged to detect a withdrawal motion of the pointing finger and/or pointing instrument from adjacent said receptacle, the filling means being arranged to fill the receptacle to a level corresponding to the position of the pointing finger and/or pointing instrument immediately before its withdrawal. In other words, in this embodiment, it is the position of the pointing finger and/or pointing instrument at withdrawal that is decisive for setting the desired level of fill within the receptacle.

Furthermore, the beverage device may also comprise a detector of a beverage level in the receptacle during filling so as to accurately monitor the progress of filling in the receptacle. Optionally, the finger detecting means forms also this level detector.

To even further increase the intuitive handling of the beverage preparation device, a user-interface may be incorporated to provide a feed-back arrangement to the user as to the position of the finger and/or pointing instrument relative to said receptacle and/or as to the level of beverage in said receptacle. Such a user-interface optionally includes a screen or a touch screen. A suitable feed-back arrangement may comprise a means, such as a laser or LED, for generating a user-visible light spot on an inner wall of the receptacle preferably at a level in the receptacle corresponding to the user-selected level of fill and the level to which the receptacle will be filled by the beverage device.

Still in the view of increasing the intuitiveness and user-friendliness of the beverage preparation device, the user-interface can be arranged to provide a graphical representation of a receptacle and at least one representation of a level in the receptacle. At least one level representation may follow any vertical motion of the pointing finger and/or pointing instrument along and adjacent a side of this virtual receptacle. This level representation optionally includes a representation of a finger and/or pointing instrument, for example a hand with a pointing finger or a stylus, against the representation of the receptacle. At least one level representation indicative of the level of beverage during filling in this virtual receptacle can be arranged to rise in accordance with the filling of the beverage in the real receptacle. In this case, the level representation may simply be a horizontal line or bar that moves upwards in the representation of the receptacle.

The finger and/or pointing instrument detecting means may include any suitable detector of objects known to the skilled person, in particular in the references set out in the above discussion on the prior art. The finger and/or pointing instrument detecting means may include a light detector, such as one or more cameras, and optionally a light emitter. For instance, the finger and/or pointing instrument detecting means includes a series of photo-emitters for emitting visible or non visible light beams and a corresponding series of photo-receivers for detecting the presence (or absence) and location of the light beams emitted by the emitters. When the machine is intended to be used with a pointing instrument, the detecting means may be specially arranged to detect the position of such an instrument nearby a cup, for instance by radio frequency or more generally magnetically, especially when the pointing instrument is made of or includes an electromagnetic part or even an RFID module.

To even further increase the intuitiveness and user-friendliness, the filling means may be arranged so that the selected level of fill may be changed by a user during the filling of the receptacle, in particular via the finger and/or pointing instrument detector means, or even via another interface such as a switch.

The finger and/or pointing instrument detecting means can be arranged to detect a vertical position of the pointing finger indicative of the user-selected level of fill and optionally a horizontal position of the pointing finger and/or pointing instrument indicative of another parameter of a beverage to be filled in the receptacle, such as a temperature, strength or mixing ratio of the beverage. The finger and/or pointing instrument detecting means can be arranged to detect this horizontal position of the pointing finger and/or pointing instrument in a peripheral space outside and adjacent the receptacle. In the case of a coffee machine, the machine may acquire the level of fill from the vertical position of the pointing finger and/or pointing instrument and the strength of the coffee from the horizontal position around the receptacle. For instance, if the user points with his finger and/or pointing instrument towards the left of the cup, a weaker coffee will be served, whereas if he points towards the right of the cup, a stronger coffee will be served. In the same manner, the user may select the proportions of milk or coffee in a milk coffee or cappuccino.

Of course, to increase the user-friendliness, the beverage device may be fitted with a screen that provides the relevant input instruction or feed-back so as to guide and/or reassure the user on the proper handling of the beverage preparation device and avoid unnecessary stress or insecurity for the user.

BRIEF DESCRIPTION OF THE DRAWINGS

The invention will now be described with reference to the schematic drawings, wherein.

DETAILED DESCRIPTION OF THE INVENTION

Figure 1:
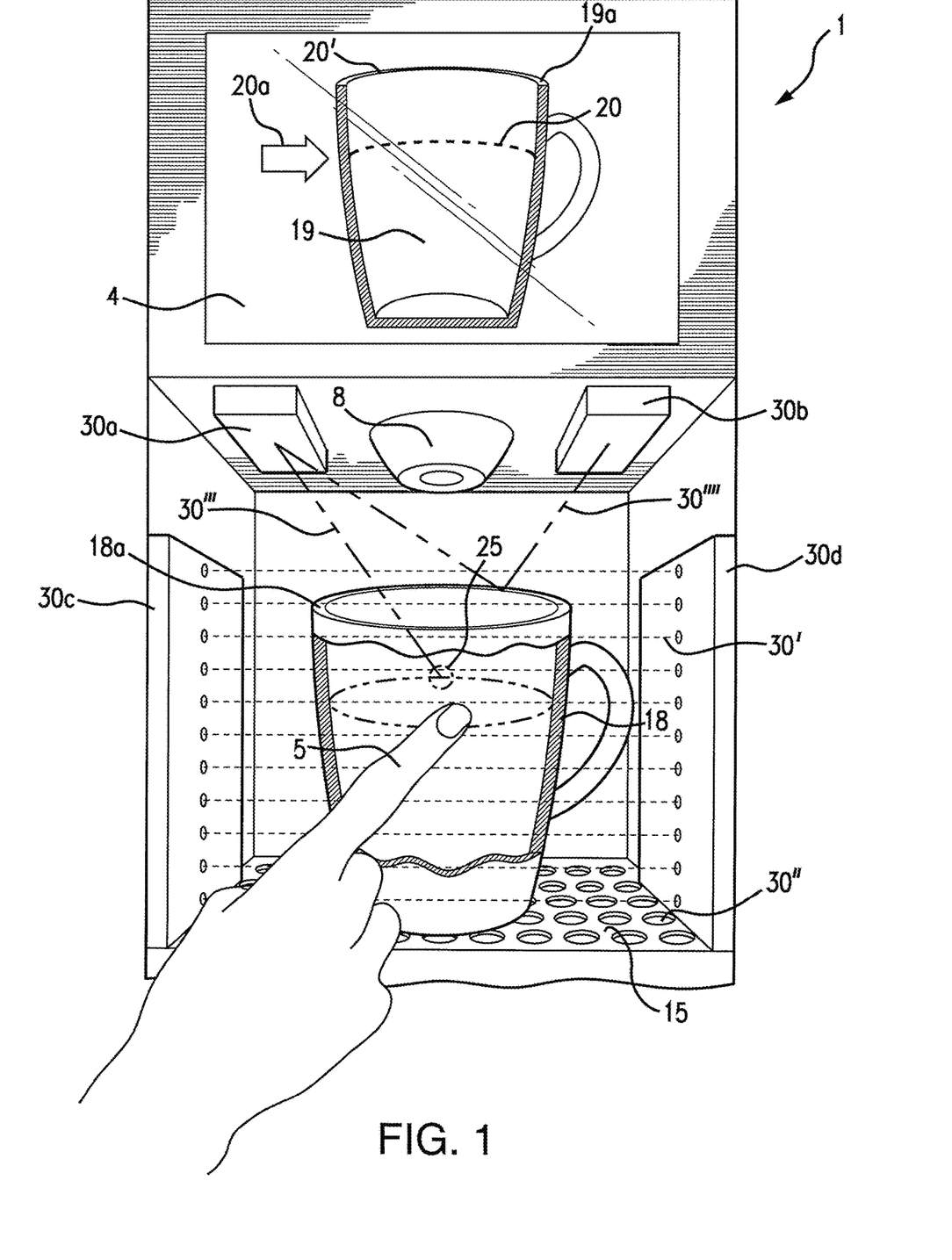
FIG. 1 shows part of a beverage preparation device according to the invention while a level of fill is being selected by a user pointing at a cup with his finger.
Figure 2:
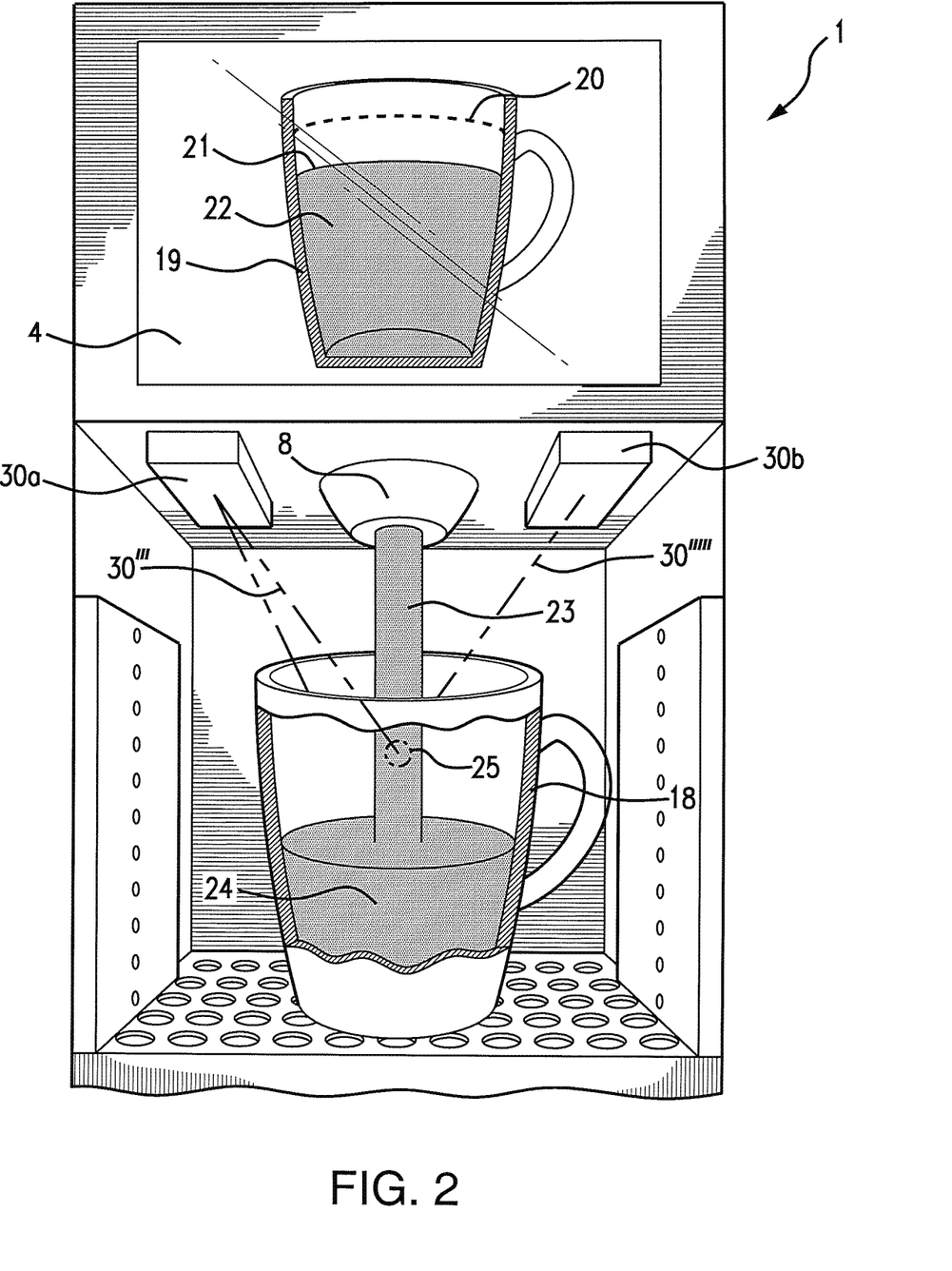
FIG. 2 shows the beverage preparation device of FIG. 1 while a beverage is being dispensed.

FIGS. 1 and 2 show a beverage preparation device 1 in accordance with the invention, such as a coffee machine for the extraction of coffee from a capsule containing ground coffee, FIG. 1 illustrating a user-selection of a certain amount of beverage to be dispensed by device 1, FIG. 2 showing the dispensing of beverage to fill the cup up to the user-selected amount of beverage.

Device 1 has a liquid circulation system with a beverage filling means including a water reservoir, pump, heater and extraction chamber connected through a water conduit for guiding water form the reservoir to the chamber via pump and heater (not shown). The extraction chamber is arranged to supply beverage prepared therein to an outlet 8 which is located above a drip tray covered with a grid 15 for supporting a cup 18 under outlet 8. The beverage filling means further includes a controller (not shown) for controlling various parameters of device 1, including parameters for the beverage preparation process, such as the control of the pump and the heater.

Moreover, device 1 has a user interface 30c,30d for allowing a user to select a desired level of fill of beverage in cup 18, level of fill being indicated by dashed line 25 in FIG. 1. Interface 30c,30d comprises a first column of emitters 30c of light rays 30',30", e.g. a column of LEDs, facing a second column of light ray detectors 30d, e.g. a column of photo-detectors. Emitter 30c and detector 30d are located in the front and on each side of outlet 8 and cup 18.

This interface 30c,30d is arranged to detect the vertical position of an object, in the present case a human finger 5 pointing on a side of cup 18. To select a level of fill 25, the user sticks his finer 5 into a space containing cup 18 which space is located below the outlet 8 and delimited by columns 30c,30d. Emitter column 30c emits a series of light beams 30',30" towards detector column 30d which may then detect which of the rays 30',30" are received and which are interrupted at a certain height by the presence of the pointing finger 5. The interrupted rays 30" of the series or rays 30',30" indicate the height of the interrupting pointing finger 5. The filling means' controller is arranged to control the liquid circulation system so as to prepare and supply an amount of beverage 23,24 up to the user-selected level of fill 25.

The controller of device 1 may be so arranged that the beverage preparation cycle and supply starts automatically with the acquisition of level of fill 25, or the controller may be arranged to expect a confirmation by the user before starting the beverage preparation and supply cycle.

Device 1 further has a pair of combined light emitters and cameras 30a,30b arranged to detect the height of the rim 18a of cup 18 to be filled via deflected ray 30"", for instance by a triangulation system or image recognition system of the type known in the art. Alternatively, the device may comprise a second pair of columns, e.g. similar to columns 30c,30d, arranged on opposite sides of cup 18 to measure its height. The controller of the filling means is arranged to initiate the filling process of cup 18 only if the detected finger level 25 via interrupted ray 30" is located below rim 18a of cup 18, the finger detecting means forming optionally the height detector of cup 18, for instance when the finger detector is a camera with an image recognition system. Thus, if the user selects by mistake a level of fill that exceeds the cup's capacity, the beverage preparation device will not start a beverage preparation cycle.

As mentioned, the vertical and optionally horizontal position of finger 5 may also be measured with light emitters and cameras 30a,30b (or just cameras) and an image recognition system.

The controller and detector for measuring the position of the pointing finger 5 on cup 18 may be arranged to detect a withdrawal motion of finger 5 from adjacent cup 18, the filling means being arranged to fill cup 18 to a level 25 corresponding to the position of pointing finger 5 immediately before its withdrawal. In such a way, the user is allowed to move his finger up and down cup 18 to make up his mind before acquisition by the controller of the desired level of fill 25.

Moreover, device 1 includes a detector, which in the present case is formed by the above light emitters and cameras 30a and 30b, for detecting when the rising level of beverage 24 in cup 18 reaches, during a beverage preparation cycle, level of fill 25 selected by a user with its finger 5 on cup 18, for example as taught in the abovementioned WO 2006/063645.

Detector 30a,30b for measuring the height of rim 18a of cup 18 or detector 30c,30d for measuring the position of finger 5 can also be used to detect any attempt to remove cup 18 from underneath outlet 8 during a beverage filling cycle and interrupt this cycle.

To increase the user-friendliness and intuitive handling of device 1, an intuitive feed-back arrangement 4,30a for comforting the user is provided.

As shown, in FIGS. 1 and 2, the feed back arrangement may include a ray emitter 30a emitting a ray 30''' that forms a visible light spot inside cup 18 indicative of the user-selected level 25 and at the same level in cup 18. Hence, emitter 30a may be arranged to follow vertical movements of finger 5, direct ray 30''' and thus the resulting light spot on the inner wall of cup 18 accordingly, until the desired height of level fill 25 has been acquired for dispensing the beverage 23.

Moreover, the feed-back arrangement may also include a screen, in particular a touch screen, 4 that provides a graphic representation of a cup 19 to be filled and the representation of the level of beverage and/or the level of fill 20 in cup 19 during the filling process of cup 18. Cup 19 may be associated with an indication of the level of fill, on its side, in the form of a graphic representation of an arrow, a pointing finger or a similar graphical representation 20a on a side of cup 19, for representing the position of the user's finger 5 on cup 18, that may possibly be moving up and down along the side of cup 18 with corresponding movements of finger 5, which movements are thus represented on screen 4. The same may provided for the virtual level of fill 20.

Also indicate on screen 4 is the cup's rim 19a and a maximum level of fill 20', above which device 1 will refuse to dispense a beverage. The dimensions, in particular the height, of virtual cup 19 with respect to level of fill 20 correspond in proportions to those of cup 18 with respect to its rim 18a and its user-selected level of fill 25.

Furthermore, during the filling cycle, the virtual representation of cup 19 may include not only the representation of the intended level of fill 20 but also a representation of the beverage 22 with its rising level 21 that is being supplied to the virtual cup 19 in line with the progress of beverage supply 23 to cup 18 and the rising level of beverage 24 therein.

Screen 4 may also include further features. In particular, when the finger detector is not only arranged to detect the height of a finger to set the amount of beverage but also the horizontal location of the finger around the cup to set another parameter of the beverage preparation, e.g. temperature, strength, concentration, etc . . . , this parameter may also be indicated on the feed-back screen, for instance with a virtual cursor on a horizontal scale. Moreover, the screen may also conceived to accept user data input regarding parameters as to the beverage preparation or as to service processes, etc . . . , for instance as disclosed in the abovementioned PCT/EP08/054858.

In a variation, emitters and receivers 30a,30b are used to detect the position of the pointing finger 5, for instance by an automatic image recognition. As mentioned above, it may be possible to detect not only the height of the pointing finger but also its horizontal location around cup 18, e.g. more or less on the left, at the front or on the right of the cup.

Figure 3:
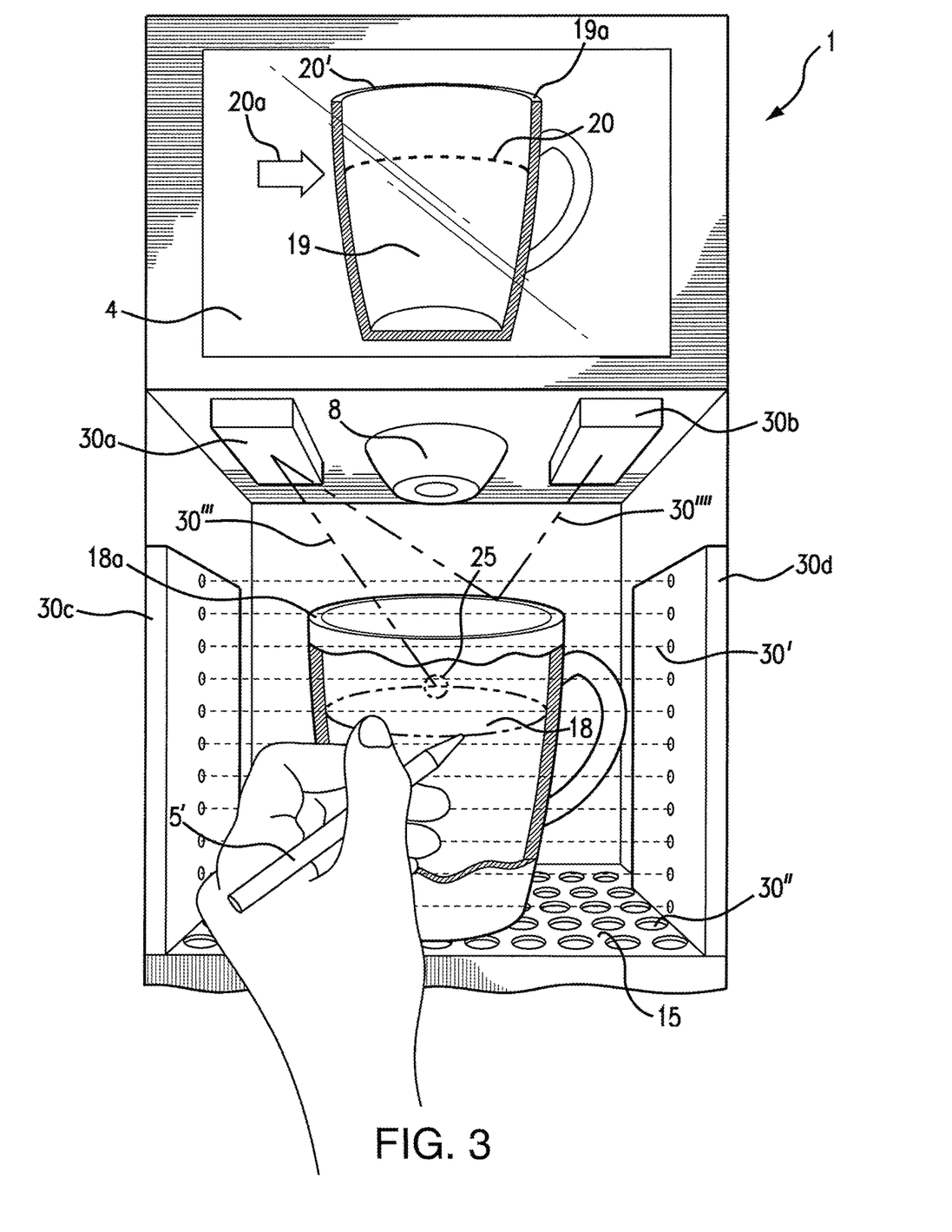
FIG. 3 shows part of a beverage preparation device according to the invention while a level of fill is being selected by a user pointing at a cup with a stylus.

FIG. 3, in which the same numeric references designate the same elements, illustrates how a user may set the desired level of fill in a cup by pointing at a cup with a freely movable pointing instrument such as a stylus 5'. The user may also use another instrument such as tea or coffee spoon.

As shown in FIG. 3, the detecting system of machine 1 is similar to the one shown above. However, for detecting such a pointing instrument or device it is possible to use dedicated systems, in particular base on a magnetic field or radio frequency as discussed above.

What is claimed is:

1. A device for filling a receptacle with a beverage comprising means for filling via an outlet a receptacle located below the outlet and a user interface for allowing a user to select a desired level of fill of beverage in the receptacle, the interface comprising means for detecting an object below the outlet, the filling means being arranged to fill the receptacle up to the user selected level of fill, wherein the detecting means is arranged to detect a position of a human finger or a hand-held freely movable pointing instrument, which human finger or pointing instrument is adjacent to and pointing towards a side of the receptacle, with the filling means being arranged to derive from the detected position of the finger or pointing instrument the user-selected level of fill and to fill the receptacle up to the level;
   wherein the device has at least one configuration selected from the group consisting of:
   the user-interface is arranged to provide a feed-back to the user as to the position of the finger or pointing instrument relative either to the receptacle or as to the level of beverage in the receptacle;
   the finger or pointing instrument detecting means includes a light detector; and
   the selected level of fill may be changed by a user during the filling of the receptacle via the finger or pointing instrument detecting means.

2. The device of claim 1, which further comprises a detector arranged to detect the height of the receptacle, the means for filling being arranged to fill the receptacle only if the detected position of the finger or pointing instrument represent the user-selected level of fill and is located below the detected height of the receptacle, with the finger or pointing instrument detecting means optionally forming the height detector.

3. The device of claim 1, which further comprises a detector arranged to detect the presence of the receptacle under the outlet of the filling means, the filling means being arranged to stop filling when the receptacle is moved away from under the outlet, with the finger or pointing instrument detecting means optionally forming the presence detector.

4. The device of claim 1, wherein the detecting means is arranged to detect a withdrawal motion of the pointing finger or pointing instrument from adjacent the receptacle, with the filling means being arranged to fill the receptacle to a level corresponding to the position of the pointing finger or pointing instrument immediately before its withdrawal.

5. The device of claim 1, further comprising a drip tray that includes a grid for supporting the receptacle below the outlet.

6. A coffee machine that includes the device of claim 1.

7. The device of claim 1, wherein the user-interface includes a screen or a touch screen.

8. The device of claim 1, which further comprises a detector of beverage level in the receptacle during filling.

9. The device of claim 8, wherein the finger or pointing instrument detecting means forms the level detector.

10. The device of claim 1, wherein the finger or pointing instrument detecting means includes a light emitter.

11. The device of claim 10, wherein the finger or pointing instrument detecting means includes a series of photo-emitters for emitting light beams and a corresponding series of photo-receivers for detecting the light beams emitted by the emitters.

12. The device of claim 1, wherein the finger or pointing instrument detecting means is arranged to detect a vertical position of the pointing finger or pointing instrument indicative of the user-selected level of fill.

13. The device of claim 12, wherein the finger or pointing instrument detecting means is arranged to detect a horizontal position of the pointing finger or pointing instrument indicative of a different parameter of a beverage to be filled in the receptacle, with the parameter including temperature, beverage strength or mixing ratio of the beverage.

14. The device of claim 12, wherein the finger or pointing instrument detecting means is arranged to detect the horizontal position of the pointing finger or pointing instrument in a peripheral space outside and adjacent the receptacle.

15. The device of claim 1, wherein the feed-back includes the formation of a user-visible light spot on an inner wall of the receptacle.

16. The device of claim 15, wherein the user-interface is arranged to provide a representation of a receptacle and at least one representation of a level in the receptacle.

17. The device of claim 16, wherein at least one level representation indicative of the level of beverage in the receptacle during filling is arranged to rise in accordance with the filling of the receptacle.

18. The device of claim 16, wherein at least one representation of a level follows any vertical motion of the pointing finger or pointing instrument along and adjacent a side of the receptacle.

19. The device of claim 18, wherein the level representation includes a representation of a finger or pointing instrument.

20. A device for filling a receptacle with a beverage comprising a mechanism for filling via an outlet a receptacle located below the outlet and a user interface for allowing a user to select a desired level of fill of beverage in the receptacle, the interface comprising an object detector for detecting an object below the outlet, the filling mechanism being arranged to fill the receptacle up to the user selected level of fill, wherein the object detector means is arranged to detect a position of a human finger or a hand-held freely movable pointing instrument, which human finger or pointing instrument is adjacent to and pointing towards a side of the receptacle, with the filling mechanism being arranged to derive from the detected position of the finger or pointing instrument the user-selected level of fill and to fill the receptacle up to the level;
wherein the device has at least one configuration selected from the group consisting of:
the user-interface is arranged to provide a feed-back to the user as to the position of the finger or pointing instrument relative either to the receptacle or as to the level of beverage in the receptacle;
the object detector means includes a light detector; and
the selected level of fill may be changed by a user during the filling of the receptacle via the object detector means.

21. A coffee machine that includes the device of claim 20.

22. The device of claim 20, wherein the user-interface includes a screen or a touch screen.

23. A method of dispensing a beverage into a receptacle positioned within a dispenser space of a dispenser assembly, the method comprising:
selecting a desired fill level for the receptacle by introducing an object pointing to the desired fill level into the dispenser space;
utilizing image data obtained from a camera exposed to the dispenser space to detect the object and ascertaining based on a position of the object, the desired fill level;
initiating dispensing to dispense the product into the receptacle;
utilizing image data from the camera to monitor a height of the product within the receptacle during the dispensing;
terminating the dispensing when the height of the product within the receptacle reaches the desired fill level; and
at least one step selected from the group consisting of:
providing a user-interface for providing a feed-back to a user as to the position of the object relative either to the receptacle or as to the level of beverage in the receptacle;
utilizing a light detector means to detect the object; and
changing, by the user, the desired fill level during the filling of the receptacle.

24. The method of claim 23, wherein the object is a human finger or pointing instrument.

25. The method of claim 23, wherein the beverage comprises coffee.

26. The method of claim 23, further comprising: detecting whether a receptacle is present within the dispenser well during a filling cycle.

27. The method of claim 23, wherein the user-interface includes a screen or a touch screen.

28. A method of dispensing a beverage into a receptacle positioned within a dispenser space of a dispenser assembly, the method comprising:
selecting a desired fill level for the receptacle by introducing an object pointing to the desired fill level into the dispenser space;
utilizing image data obtained from a camera exposed to the dispenser space to detect the object and ascertaining based on a position of the object, the desired fill level;
initiating dispensing to dispense the product into the receptacle;
detecting a presence of the receptacle within the dispenser well;
initiating the dispensing only after the presence of the receptacle is detected; and
at least one step selected from the group consisting of:
providing a user-interface for providing a feed-back to a user as to the position of the object relative either to the receptacle or as to the level of beverage in the receptacle;
utilizing a light detector means to detect the object; and
changing, by the user, the desired fill level during the filling of the receptacle.

29. The method of claim 28, wherein the dispenser well comprises a drip tray that includes a grid for supporting the receptacle below the outlet.

30. The method of claim 28, wherein the beverage comprises coffee.

31. The device of claim 28, wherein the user-interface includes a screen or a touch screen.

32. A method of dispensing a beverage into a receptacle positioned within a dispenser well of a dispenser assembly, the method comprising:
selecting a desired fill level for the receptacle by introducing an indicating object into the dispensing well, wherein the indicating object is a user's finger;
utilizing image data obtained from a camera exposed to the dispenser well to detect a presence of the indicating object, and ascertaining with the image data the desired fill level for a dispensing event;
initiating the dispensing event to dispense the product into the container; and
at least one step selected from the group consisting of:
providing a user-interface for providing a feed-back to the user as to the position of the indicating object relative either to the receptacle or as to the level of beverage in the receptacle;

utilizing a light detector means to detect the indicating object; and changing, by a user, the desired fill level during the dispensing of the beverage into the receptacle.

33. The method of claim 32, wherein the beverage comprises coffee.

34. The method of claim 32, wherein the dispenser well comprises a drip tray that includes a grid for supporting the receptacle below the outlet.

35. The device of claim 32, wherein the user-interface includes a screen or a touch screen.

* * * * *